United States Patent
Yang et al.

(10) Patent No.: US 9,558,458 B2
(45) Date of Patent: Jan. 31, 2017

(54) METHOD FOR ALLOCATING SPATIAL RESOURCES

(71) Applicants: Guangwei Yang, Mason, OH (US); Michael Lee Hilton, Fairfield, OH (US)

(72) Inventors: Guangwei Yang, Mason, OH (US); Michael Lee Hilton, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 797 days.

(21) Appl. No.: 13/721,087

(22) Filed: Dec. 20, 2012

(65) Prior Publication Data

US 2014/0180642 A1   Jun. 26, 2014

(51) Int. Cl.
*G06F 17/50* (2006.01)
*G06Q 10/04* (2012.01)
*G06Q 10/08* (2012.01)

(52) U.S. Cl.
CPC ............ *G06Q 10/04* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 4,947,322 A * | 8/1990 | Tenma | G06Q 10/06312 340/4.6 |
| 6,026,417 A | 2/2000 | Ross et al. | |
| 6,493,663 B1 | 12/2002 | Ueda | |
| 7,844,418 B2 | 11/2010 | Hemmett et al. | |
| 8,121,852 B2 | 2/2012 | Frank et al. | |
| 8,527,321 B2 * | 9/2013 | Bottom | G06Q 10/04 705/317 |
| 2003/0083925 A1 * | 5/2003 | Weaver | G06Q 10/06 705/7.34 |
| 2005/0197928 A1 | 9/2005 | Fotteler et al. | |
| 2005/0203790 A1 * | 9/2005 | Cohen | G06Q 30/02 705/7.31 |
| 2006/0047809 A1 | 3/2006 | Slattery et al. | |
| 2007/0050235 A1 * | 3/2007 | Ouimet | G06Q 10/06375 705/7.31 |
| 2013/0226826 A1 * | 8/2013 | Hathaway | G06Q 30/02 705/348 |
| 2015/0199627 A1 * | 7/2015 | Gould | G06Q 10/087 705/7.12 |

OTHER PUBLICATIONS

International Search Report dated May 14, 2014, 10 pages.

\* cited by examiner

*Primary Examiner* — Omar Fernandez Rivas
*Assistant Examiner* — Bijan Mapar
(74) *Attorney, Agent, or Firm* — David K Mattheis

(57) ABSTRACT

A method for allocating spatial resources including steps of: providing a store layout; assigning categories to locations in the store layout, calculating a total score for the first store layout; and implementing the category assignments in a store.

15 Claims, 4 Drawing Sheets

Fig. 1

METHOD FOR ALLOCATING SPATIAL RESOURCES

FIELD OF THE INVENTION

The invention relates to the allocation of spatial resources in a physical environment. The method relates particularly to the allocation of spatial resources among consumer market categories in a retail environment.

BACKGROUND OF THE INVENTION

Retail environments offering shoppers access to more than a single market category are well known. Such environments are subject to the constraints imposed by the physical size of the environments. Only a defined amount of space is available and choices must be made as to how much of the available space may be allocated to each particular category of goods as well as to the determination of the relative locations of each type of goods with regard to all, or any other categories of goods.

Categories of goods are arranged within environments based upon past experience and historical sales figures as well as incentives offered by the suppliers of goods to the retailer. What is desired is a systematic way of optimizing the allocation and arrangement of market categories within a retail environment.

SUMMARY OF THE INVENTION

In one aspect, a method for allocating spatial resources comprising steps of: providing a store layout; assigning categories to locations in the store layout, creating a first store layout with assigned category locations; translating the store layout with assigned category locations into a first distance relationship matrix; providing an ideal category relationship matrix; calculating a total score for the first store layout with assigned category locations by comparing the first distance relationship matrix to the ideal category relationship matrix; and implementing the category assignments in a store.

BRIEF DESCRIPTION OF THE DRAWINGS

FIG. 1 provides a schematic illustration of a retail environment.

DETAILED DESCRIPTION OF THE INVENTION

Definitions

Figure 2:
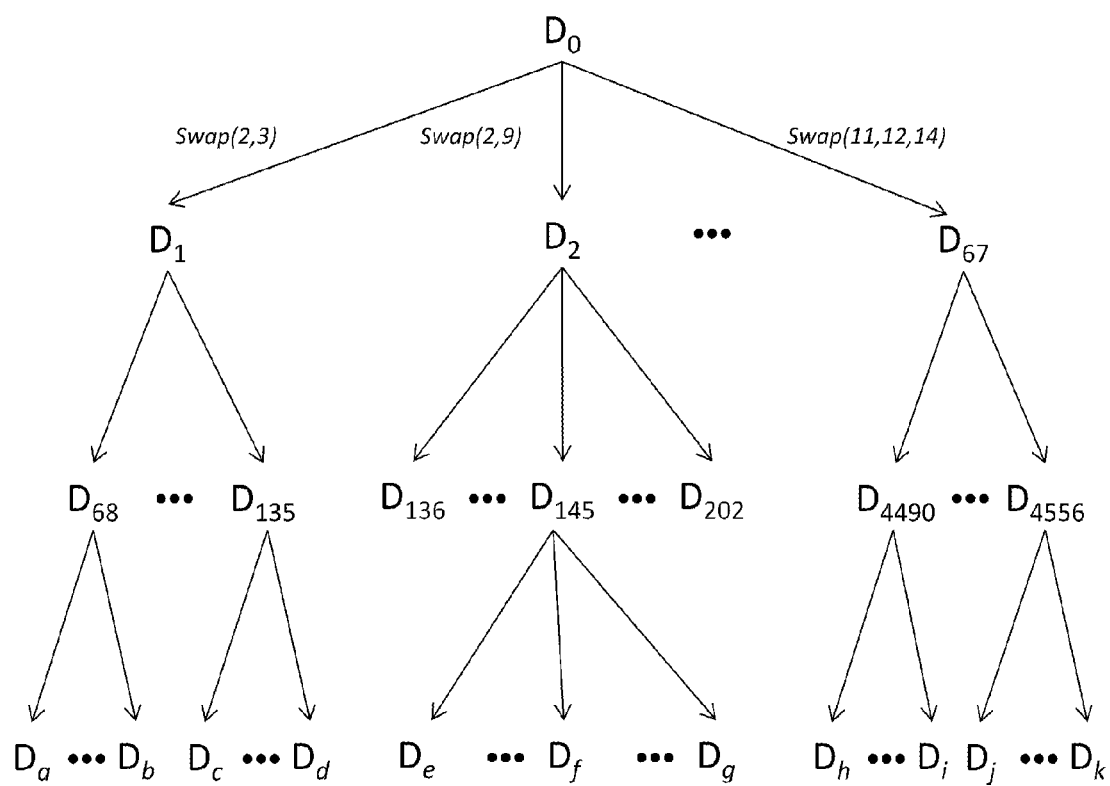
FIG. 2 provides a graphical illustration of an optimizing process using the method of the invention.

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

In one aspect, the method provides information in support of decisions relating to the allocation of limited spatial resources within a physical retail environment. The method may also be applied to determine information in support of decisions relating to the allocation of resources in any environment comprising multiple categories of goods or other items which are subject to consumption or observation, and which may be categorized in terms of their relative spatial relationships and their relative value to the consuming population. The method may be applied to the allocation of space to, and relative positioning of differing categories of goods in a retail setting, art in a museum setting—where consumption comprises viewing of the art—and other analogous environments.

The method comprises a step of providing a layout of the relevant environment. The layout may be provided as a two dimensional or three dimensional representation of an actual existing, or planned environment.

The provided layout may include subdivisions of the environment into spatial units using any approach which yields an adequate description of the environment in terms of how space will actually be allocated. As an example, a retail store environment may be subdivided into a grid of locations associated with the size and spacing of the display shelving in use or planned for the space.

The provided layout may include consideration of the actual or planned shelf and display systems, the aisles, the walls, number of floors, methods for moving between floors, etc. of the environment.

Using the provided layout, categories of goods may be allocated to the subdivided environment locations within the layout in any acceptable manner such as using the knowledge and experience of retail space planners. This initial allocation yields a first environment or store layout having assigned category locations.

The created first environment is then translated into a first distance relationship matrix. The distance relationship matrix is analogous to and indicative of the shortest physical distance between each pair of categories in the provided store layout after categories are assigned locations. A shorter physical separation is considered indicative of a higher physical adjacency. As this is an inverse relationship, the actual physical distance data may be normalized using a relationship such as: normalizedDistance=1−[Distance(i,j)/maximumDistance], where Distance(i,j) is the shortest physical distance between categories (i) and (j), and maximum Distance is the maximum physical separation possible in the environment. The collection of normalized values of Distance (i,j) may be expressed as a matrix.

An ideal category relationship matrix is created to provide an indication of how closely pairs of categories are related to each other. This may also be considered the Adjacency matrix, and shows the relative importance of having any particular category immediately adjacent to any other particular category is considered to be. The adjacency matrix may be constructed utilizing statistical data from historical sales relating the probability that a shopper purchasing/consuming an item from a first category will also purchase/consume an item from a second category. The adjacency matrix may be constructed using data from surveys of shoppers or consumers querying their opinions regarding the relationship of the categories.

A total score may be calculated for the first environment having assigned category locations. The score may be calculated by comparing the distance matrix with the ideal matrix. The calculated total score may be reviewed to determine if it is high enough—reflecting a good match between the first store layout and the ideal layout. If the total score is considered acceptable, or high enough, the first store layout may be implemented in an actual store or may be finalized as the layout for a planned store.

In instances where the total calculated score for the first layout is not considered high enough, the extent of the match with the ideal layout is not considered acceptable, a second, third or subsequent layout with category assignments may be provided and scored in comparison to the ideal assignment matrix. The details of category placement assignments from any of these layouts may be implemented in the actual or planned retail environment.

The total score may also be calculated with an additional Importance matrix. The Importance matrix, Importance(i,j), describes how important the pair of categories (i,j) is, relative to all of the other available category pairs. The larger the numeric value of Importance(i,j), the more important the category pair (i,j) is. The importance matrix allows the adjacency simulator to take into account the goals of the store manager or others. For example, the store manager may desire to improve the adjacency of frequently bought items at the expense of less frequently bought items; or the manager might favor high-profit margin items. This is accomplished by assigning values to the respective pairs (i,j) which reflect the priorities of the store manager and subsequently using the define Importance matrix in the calculation of the total score.

Coherence(i,j) is a measure of how well the distance between categories agrees with the adjacency values of the categories. Coherence is determined by using the respective Distance(i,j) values to rank order the category pairs and compare the result to what the rank ordering should ideally be according to the Adjacency(i,j) values. Ideally, category pairs that have larger adjacency values should be located closer together (i.e., have a smaller distance) in the store. So, the correctness measure, Coherence(i,j), indicates how closely the descending adjacency rank ordering matches the ascending distance rank ordering.

It is also possible to consider a penalty factor to be applied to any layout wherein categories are split amongst multiple locations within a single layout. The layout penalty may be expressed as a percentage points subtracted from the total score for the particular layout and may vary according to the number of categories which are split in the layout.

A category adjacency threshold value may be specified as part of the calculation of the total score for a layout. The adjacency threshold value is used to simplify the calculation of the total score by reducing the size of the adjacency matrix considered during the total score calculation. All adjacency matrix values less than the specified category threshold value are removed from consideration during the calculation of the total score. As an example, for a category adjacency threshold value of 0.2, all adjacency values less than 0.2 will not be used to calculate the total score of the layout under evaluation.

In one aspect, the method may further comprise additional steps wherein the assigned location of at least two categories in the original store layout are swapped, thereby exchanging the locations of the at least two categories in what will then be a new, second store layout. The new second store layout may then be translated into a second distance matrix. A second total score may then be calculated for the second store layout using the second distance matrix and the ideal category relationship matrix. The original total score and the second total score may then be compared and the layout having the higher total score may be implemented in an actual retail environment.

As noted above, category importance, score coherence, a category adjacency threshold factor and category layout penalties may be used individually or in combination in the calculation of the total score.

In one aspect the method may be performed utilizing additional steps wherein an opportunity score associated with at least one pair of categories is calculated. The opportunity score is indicative of the potential increase in the total score that could be attained if the category pair (i,j), were ideally placed in the proposed store layout. An opportunity score of zero indicates that the category pair is ideally placed within the store layout. Altering the location of any category to reduce the opportunity score of a particular category pair also alters at least one other category location and alters at least one other opportunity score. The opportunity score may be used to work iteratively through various possible layouts efficiently by providing an indication of which category swaps will yield the largest overall total score for the new layout. The resulting store layout may then be implemented in an actual environment.

Example Calculations of the Total Score:

For the example, a simple store layout having 4 categories, A, B, C, and D is considered.

The adjacency matrix for this store is defined for the example as:

$$\text{Adjacency}(i, j) = \begin{array}{c|cccc} & A & B & C & D \\ \hline A & 1.0 & 0.6 & 0.4 & 0.2 \\ B & 0.6 & 1.0 & 0.5 & 0.3 \\ C & 0.4 & 0.5 & 1.0 & 0.1 \\ D & 0.2 & 0.3 & 0.1 & 1.0 \end{array}$$

and the distance matrix is defined by:

$$\text{Distance}(i, j) = \begin{array}{c|cccc} & A & B & C & D \\ \hline A & 0 & 5 & 6 & 14 \\ B & 5 & 0 & 6 & 9 \\ C & 6 & 6 & 0 & 8 \\ D & 14 & 9 & 8 & 0 \end{array}$$

The rank ordering of these adjacencies and distances is

Desired Ordering

Adjacency

| AB | 0.6 |
|----|-----|
| BC | 0.5 |
| AC | 0.4 |
| BD | 0.3 |
| AD | 0.2 |
| CD | 0.1 |

Actual Ordering

Distance

| AB | 5 |
|----|----|
| BC | 6 |
| AC | 6 |
| CD | 8 |
| BD | 9 |
| AD | 14 |

The normalized distance matrix:

Normalized Distance

| AB | 0.64 |
|----|------|
| BC | 0.57 |
| AC | 0.57 |
| CD | 0.43 |
| BD | 0.36 |
| AD | 0 |

A weight, weight(i,j), for each pair is calculated as:

$$\text{weight}(i, j) = \frac{\text{Adjacency}(i, j)}{\sum_{i,j} \text{Adjacency}(i, j)}$$

In its simplest form, and as:

$$\text{weight}(i, j) = \frac{\text{Adjacency}(i, j) \times \text{Importance}(i, j)}{\sum_{i,j} \text{Adjacency}(i, j) \times \text{Importance}(i, j)}$$

When Importance is also considered in the calculation. Total score may then be calculated according to:

$$\text{TotalScore} = \Sigma_{i,j} \text{normDistance}(i,j) \times \text{weight}(i,j)$$

Which, for the example store yields a total score of 0.52 Adding an Importance matrix:

Importance

| AB | 6 |
|----|---|
| BC | 5 |
| AC | 4 |
| CD | 3 |
| BD | 2 |
| AD | 1 |

Allows the weight(i,j) to be calculated using the additional Importance factor as provided above.

This yields a refined total score of 0.57 considering Importance.

Calculating Coherence:

As noted, Coherence(i,j), indicates how closely the descending adjacency rank ordering matches the ascending distance rank ordering.

For the example:

| (i, j) | Pairs with adjacency < Adjacency(i, j) | Pairs with distance > Distance(i, j) | Number Correct | Pairs with adjacency > Adjacency(i, j) | Pairs with distance < Distance(i, j) | Number Correct | Total Correct | Coherence (i, j) |
|--------|----------------------------------------|--------------------------------------|----------------|----------------------------------------|--------------------------------------|----------------|---------------|------------------|
| AB | AC, AD, BC, BD, CD | AC, AD, BC, BD, CD | 5 | | | | 5 | 1.0 |
| AC | AD, BD, CD | AD, BD, CD | 3 | AB, BC | AB | 1 | 4 | 0.6 |
| AD | CD | | | AB, AC, BC, BD | AB, AC, BC, BD, CD | 4 | 4 | 0.6 |
| BC | AC, AD, BD, CD | AD, BD, CD | 3 | AB | AB | 1 | 4 | 0.6 |
| BD | AD, CD | AD | 1 | AB, AC, BC | AB, AC, BC, CD | 3 | 4 | 0.6 |
| CD | | AD, BD | | AB, AC, AD, BC, BD | AB, AC, BC | 3 | 3 | 0.2 |

The formula for Coherence will be derived in stages, starting with a prose description of the formula and progressively replacing parts of the prose with mathematical notation.

$$\text{Coherence}(i, j) = \frac{\begin{array}{c}\text{The number of pairs } (m, n) \text{ such that either} \\ (\text{Adjacency}(m, n) > \text{Adjacency}(i, j) \text{ and} \\ \text{Distance}(m, n) < \text{Distance}(i, j)) \text{ or} \\ (\text{Adjacency}(m, n) < \text{Adjacency}(i, j) \text{ and} \\ \text{Distance}(m, n) > \text{Distance}(i, j))\end{array}}{\text{The total number of pairs } (m, n)}$$

In the next step, the set operation ∀(m, n), generates all the possible pairs (m,n) and returns a set of the pairs that satisfy the condition which follows the operator. The set operations union (∪) and intersection (∩) perform the "and" and "or" logic.

$$\text{Coherence}(i, j) = \frac{\text{The number of pairs in } \forall (m, n) \begin{Bmatrix} (\text{Adjacency}(m, n) > \text{Adjacency}(i, j) \cup \\ \text{Distance}(m, n) < \text{Distance}(i, j)) \cap \\ (\text{Adjacency}(m, n) < \text{Adjacency}(i, j) \cup \\ \text{Distance}(m, n) > \text{Distance}(i, j)) \end{Bmatrix}}{\text{The number of pairs in } \forall (m, n)}$$

Finally, the Size(s) function returns the number of elements in the set s.

$$\text{Coherence}(i, j) = \frac{\text{Size}\left(\forall (m, n) \begin{Bmatrix} (\text{Adjacency}(m, n) > \text{Adjacency}(i, j) \cup \\ \text{Distance}(m, n) < \text{Distance}(i, j)) \cap \\ (\text{Adjacency}(m, n) < \text{Adjacency}(i, j) \cup \\ \text{Distance}(m, n) > \text{Distance}(i, j)) \end{Bmatrix}\right)}{\text{Size}(\forall (m, n))}$$

The value of Coherence(i,j) ranges between zero and one. In order to penalize badly ordered pairs, normalize Coherence(i,j) may be normalized so it is scaled to be between 1.0 and −1.0.

$$\text{normCoherence}(i, j) = \frac{\text{Coherence}(i, j) - 0.5}{0.5}$$

Other normalizations of Coherence(i,j) may be performed to suit the particular needs of the simulator.

Penalty points are calculated according to the number of categories which are split in the store layout.

The total score calculated considering the Importance and Coherence:

$$\sum_{i,j} \text{normDistance}(i, j) \times \text{normCoherence}'(i, j) \times \text{weight}(i, j)$$

And total score calculated further taking into consideration the penalties:

$$\sum_{i,j} \text{normDistance}(i, j) \times \text{normCoherence}'(i, j) \times \text{weight}(i, j) + \sum_{i} \text{Penalties}(i)$$

The Opportunity(i,j) score for each category pair may be calculated using:

$$\text{Opportunity}(i,j) = (1 - \text{normDistance}(i,j)) \times \text{weight}(i,j)$$

And the calculated opportunity scores may then be used as an indication of the potential improvements each category pair swap represents towards improving the total score.

Total score and opportunity score are presented as percentages. A perfect total score has a value of 100% representing a situation where the placement of each category relative to all other categories matches the ideal locations of the categories.

Optimization:

In one aspect an iterative optimization routine may be used to analyze a store layout to determine if improvements to the layout may be made.

Instead of evaluating all possible designs, the optimization starts with a presumed, "reasonable" store design and then tries to improve it in an iterative fashion. The optimizer provides two strategies for attempting to improve the design: 1) swapping entire categories that are of the same size; and 2) swapping display blocks of the same size.

Figure 1:
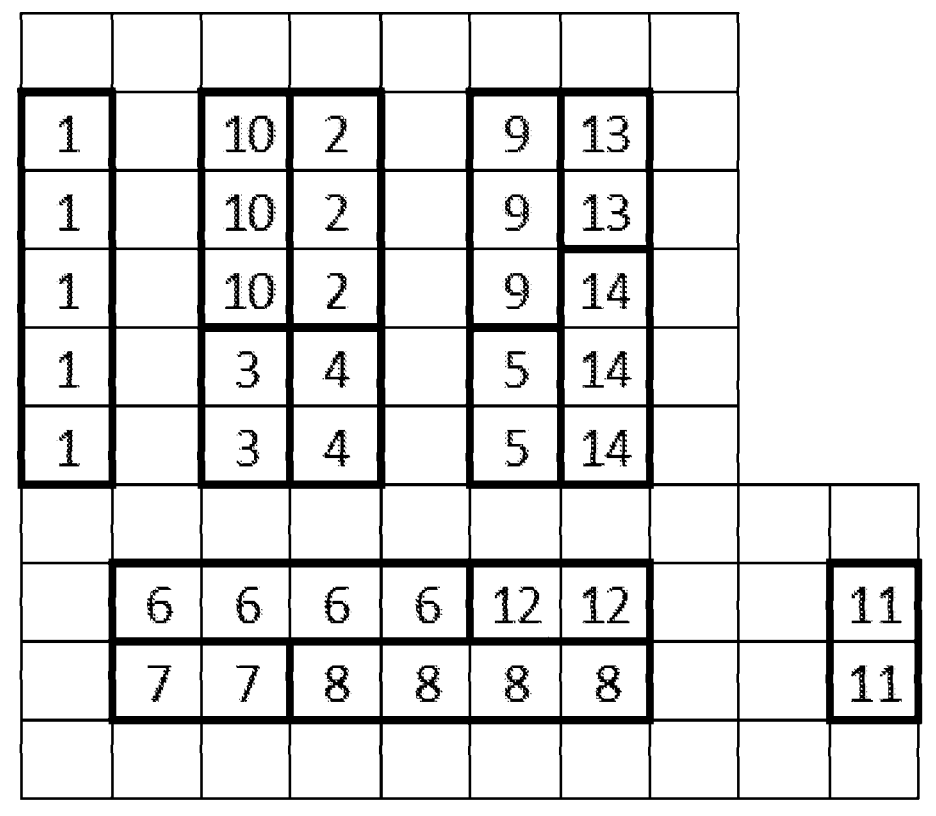

For these examples, a store having 14 categories, illustrated in FIG. 1, occupying a total of 39 locations cells is presumed. To consider all possible layouts 39! layouts would need to be considered. The optimizer avoids this computational expensive route.

Swapping Categories of the Same Size

The optimizer may limit swaps to be between categories of the same size, cutting down on the number of possibilities tremendously:

| Size | Categories | n | All Swaps (n!) |
|---|---|---|---|
| 5 | 1 | 1 | 0 |
| 4 | 6, 8 | 2 | 1 |
| 3 | 2, 3, 9, 14 | 4 | 24 |
| 2 | 4, 5, 7, 10, 11, 12, 14 | 7 | 5040 |

For the example store, 87,178,291,200 possibilities are reduced down to 5,065, which would only take about one and a half minutes to compute. But for a large store, this can still take a lot of compute time. To simplify things even further, instead of calculating all possible swaps, possible swaps are restricted to swaps of only two and three categories at one time. Now there are only 67 possibilities:

| Size | Categories | n | Swaps of 2 (n C 2) | Swaps of 3 (n C 3) |
|---|---|---|---|---|
| 5 | 1 | 1 | 0 | 0 |
| 4 | 6, 8 | 2 | 1 | 0 |
| 3 | 2, 3, 9, 14 | 4 | 6 | 4 |
| 2 | 4, 5, 7, 10, 11, 12, 14 | 7 | 21 | 35 |

The down side of restricting the kinds of swaps allowed is that not as many possible designs are explored and the absolute best design may be missed. The situation may be improved somewhat by taking an iterative approach to optimizing the store design. Starting out with design $D_0$ and exploring all the swaps of two and three, yielding an improved design $D_1$. Then, exploring all the swaps of two and three of $D_1$, yielding an improved design $D_2$. As shown in FIG. 2. Somewhere in the complete search tree lies the best store design; perhaps one level down or perhaps 15 levels down.

Iterative Search Strategy

The starting point $D_0$ for the optimal store search is the store design currently shown in the display window of the Adjacency Simulator. For each iteration of the optimizer, the simulator will attempt to generate and score many new store designs that are derived from $D_0$ by swapping two or three categories. How many new store designs are generated for each button press may be specified in a software setting SearchQuota associated with the optimization. The default value of SearchQuota is 200, so that value will be used for this example.

Figure 3:
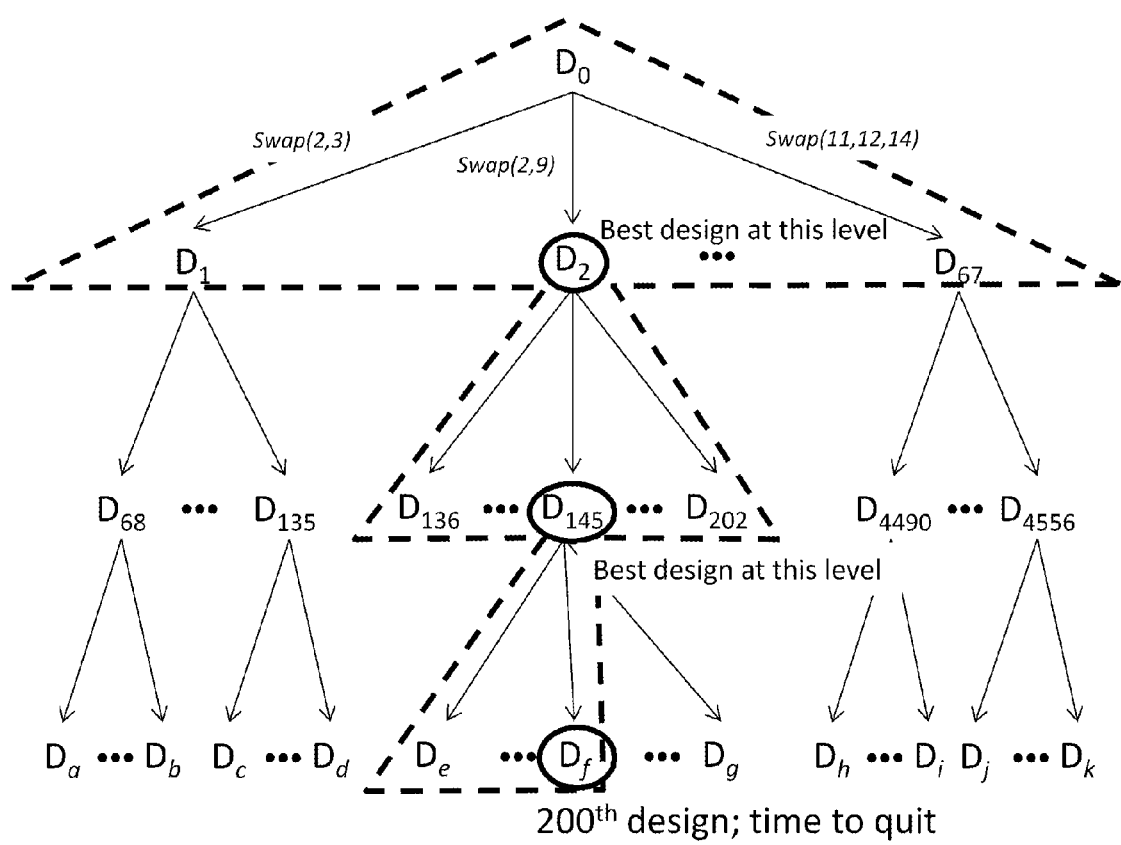
FIG. 3 provides a graphical illustration of an optimizing process using the method of the invention.

For many store designs, less than 200 new designs can be generated by swapping two and three categories. That is the case with this example store, which can only generate 67 new designs. In this situation, the best design of the 67 will be chosen and its children explored. This will continue until 200 new designs have been examined as illustrated in FIG. 3. The triangles in the figure show an example of how the 200 search nodes might be explored during a single optimization run.

The simulator keeps a list of the ten best designs it encounters at any point in the iterative searching process. To search more of the search tree, one of the ten best designs is selected and the simulator is run again.

Swapping Display Blocks of the Same Size

Figure 4:
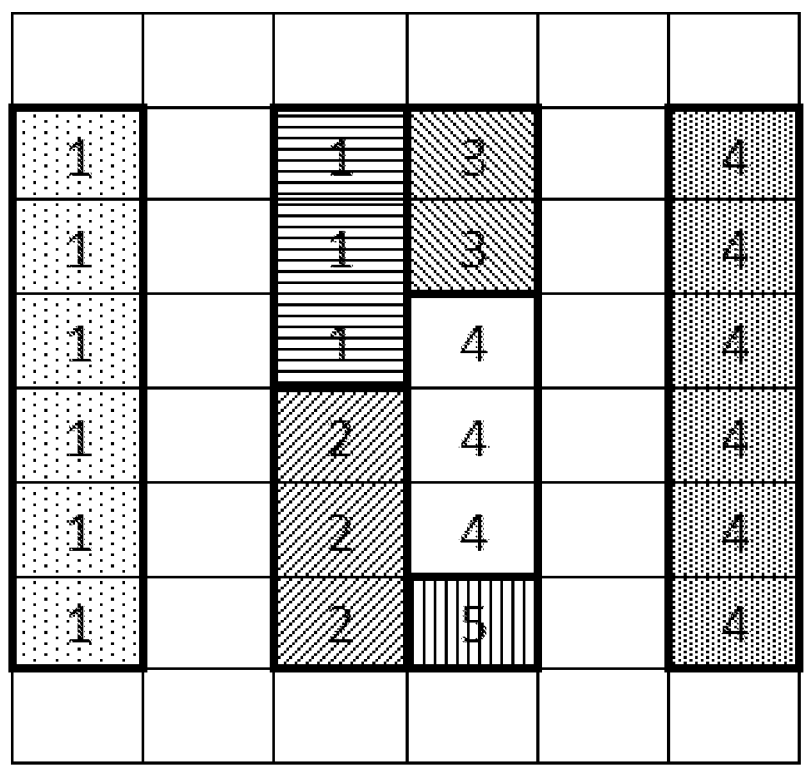
FIG. 4 provides a schematic illustration of a retail environment.

The second search strategy, implemented by the optimizer, relaxes the requirement that every cell in a category must be swapped at the same time. Instead, contiguous cells belonging to the same category are grouped together into blocks that get swapped in groups of two and three, similar to what happens in the "Swap Categories" algorithm. In the example store design presented earlier, there happens to be only one block per category, because no categories are split across more than one display unit. However, some categories in the example illustrated in FIG. 4 are split across display units, forming seven blocks (which are outlined in black). When the swap blocks strategy is used, the search is performed using the same kind of iterative search described above with the additional ability to swap sub-category blocks as well as complete category locations.

C# (C sharp) is an exemplary programming language for encoding the blocks of the method for use by a computer system. An exemplary system for implementing the blocks of the claimed method and apparatus includes a general purpose computing device in the form of a computer. Components of computer may include, but are not limited to, a processing unit, a system memory, and a system bus that couples various system components including the system memory to the processing unit.

The computer may operate in a networked environment using logical connections to one or more remote computers, such as a remote computer, via a local area network (LAN) and/or a wide area network (WAN) via a modem or other network interface.

Computer typically includes a variety of computer readable media that may be any available media that may be accessed by computer and includes both volatile and nonvolatile media, removable and non-removable media. The system memory includes computer storage media in the form of volatile and/or nonvolatile memory such as read only memory (ROM) and random access memory (RAM). The ROM may include a basic input/output system (BIOS). RAM typically contains data and/or program modules that include operating system, application programs, other program modules, and program data. The computer may also include other physical removable/non-removable, volatile/nonvolatile computer storage media such as a hard disk drive a magnetic disk drive that reads from or writes to a magnetic disk, and an optical disk drive that reads from or writes to an optical disk, or solid state memory elements. The hard disk drive may interface with system bus via interfaces. Communication media, separate from the computer readable media and computer storage media described above, may include data signals and propagated media such as carrier waves.

A user may enter commands and information into the computer through input devices such as a keyboard and pointing device, commonly referred to as a mouse, trackball or touch pad. Other input devices (not illustrated) may include a microphone, joystick, game pad, satellite dish, scanner, or the like. These and other input devices are often connected to the processing unit through a user input interface that is coupled to the system bus, but may be connected by other interface and bus structures, such as a parallel port, game port or a universal serial bus (USB). A monitor or other type of display device may also be connected to the system bus via an interface, such as a video interface. In addition to the monitor, computers may also include other peripheral output devices such as speakers and printer, which may be connected through an output peripheral interface.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for allocating spatial resources, the method comprising steps of:
    a) providing a store layout;
    b) assigning categories to locations in the store layout, creating a first store layout with assigned category locations;
    c) translating the store layout with assigned category locations into a first distance relationship matrix;
    d) providing an ideal category relationship matrix, wherein the ideal category relationship matrix provides an indication of how closely pairs of categories are related to each other;
    e) calculating a total score for the first store layout with assigned category locations by comparing the first distance relationship matrix to the ideal category relationship matrix;
    f) implementing the category assignments in a store.

2. The method according to claim 1 further comprising calculating the total score according to a category importance factor.

3. The method according to claim 1 further comprising calculating the total score according to category layout penalties.

4. The method according to claim 1 further comprising calculating the total score according to a coherence factor.

5. The method according to claim 1 further comprising calculating the total score according to a category adjacency score threshold.

6. The method according to claim 1, further comprising steps of:
- g) swapping the assigned locations of at least two categories in the store layout creating a second store layout with assigned category locations;
- h) translating the second store layout with assigned category locations into a second distance relationship matrix;
- i) calculating a total score for the second store layout with assigned category locations by comparing the second distance relationship matrix to the ideal category relationship matrix;
- j) selecting the store layout with assigned categories having the most favorable comparison to the ideal category relationship matrix.

7. The method according to claim 6 further comprising calculating the total score according to a category importance factor.

8. The method according to claim 6 further comprising calculating the total score according to category layout penalties.

9. The method according to claim 6 further comprising calculating the total score according to a coherence factor.

10. The method according to claim 6 further comprising calculating the total score according to a category adjacency score threshold.

11. The method according to claim 1 further comprising steps of:
- k) calculating an opportunity score associated with at least one pair of categories;
- l) changing the relative locations of two categories according to a calculated opportunity score;
- m) implementing the category assignment of one member of the set.

12. The method according to claim 11 further comprising calculating the total score according to a category importance factor.

13. The method according to claim 11 further comprising calculating the total score according to category layout penalties.

14. The method according to claim 11 further comprising calculating the total score according to a coherence factor.

15. The method according to claim 11 further comprising calculating the total score according to a category adjacency score threshold.

* * * * *